US009546457B2

(12) United States Patent
Alvarez et al.

(10) Patent No.: US 9,546,457 B2
(45) Date of Patent: Jan. 17, 2017

(54) PLANT FOR MANUFACTURING HALF WARM MIX ASPHALTS

(76) Inventors: Antonio Alvarez Alvarez, Madrid (ES); Francisco Antonio Alvarez Gumbiel, Madrid (ES)

( * ) Notice: Subject to any disclaimer, the term of this patent is extended or adjusted under 35 U.S.C. 154(b) by 1051 days.

(21) Appl. No.: 13/515,151

(22) PCT Filed: Oct. 29, 2010

(86) PCT No.: PCT/ES2010/070704
§ 371 (c)(1),
(2), (4) Date: Jul. 12, 2012

(87) PCT Pub. No.: WO2011/070205
PCT Pub. Date: Jun. 16, 2011

(65) Prior Publication Data
US 2012/0273062 A1 Nov. 1, 2012

(30) Foreign Application Priority Data

Dec. 10, 2009 (ES) .................................. 200931143

(51) Int. Cl.
*C08L 91/06* (2006.01)
*C08L 95/00* (2006.01)
(Continued)

(52) U.S. Cl.
CPC ............ *E01C 19/10* (2013.01); *E01C 19/1004* (2013.01); *E01C 19/1072* (2013.01); *Y10T 137/6416* (2015.04)

(58) Field of Classification Search
USPC ................................. 106/270, 276, 277, 278
See application file for complete search history.

(56) References Cited

U.S. PATENT DOCUMENTS

| 2002/0170464 | A1* | 11/2002 | Larsen | .................... | C08L 93/00 |
| | | | | | 106/273.1 |
| 2004/0244646 | A1* | 12/2004 | Larsen | .................... | C08L 93/00 |
| | | | | | 106/122 |
| 2008/0041276 | A1* | 2/2008 | Riebesehl | ............... | C10C 3/007 |
| | | | | | 106/660 |

FOREIGN PATENT DOCUMENTS

| DE | 102005020836 A1 | 11/2006 |
| EP | 1469038 A1 | 10/2004 |

(Continued)

OTHER PUBLICATIONS

International Search Report PCT/ES2010/070704 dated Feb. 25, 2011.

*Primary Examiner* — James McDonough
(74) *Attorney, Agent, or Firm* — Springut Law PC; Franklin S. Abrams

(57) ABSTRACT

The invention relates a plant (1) for manufacturing half warm mix asphalts which comprises: a first moveable platform (10) for feeding in a controlled manner some or all of the aggregates of the half warm mix asphalt to a second moveable platform (30), wherein said aggregates are heated; a second moveable platform (30), wherein some or all of the aggregates coming from the first moveable platform (10) are heated in a drying drum (33); a third moveable platform (40), which extracts and filters powder from the aggregates coming from the second mobile platform (30), subsequently feeding it to the fourth moveable platform of the plant; a fourth moveable platform (20), wherein the material coming from the exit of the second moveable platform (30) or arriving directly from the first moveable platform (10) is mixed with a binder, with a filler and with any other materials, the mixed materials being different according to the desired end product, the temperature of the mixed (Continued)

materials being comprised between 70° C. and 100° C.; and
the binder being an emulsion.

9 Claims, 4 Drawing Sheets

(51) Int. Cl.
    *C09D 4/00*         (2006.01)
    *C09D 101/00*     (2006.01)
    *C09D 201/00*     (2006.01)
    *E01C 19/10*      (2006.01)

(56) References Cited

FOREIGN PATENT DOCUMENTS

| EP | 1712680 A1 | 10/2006 |
|----|------------|---------|
| GB | 2418155 A  | 3/2006  |

\* cited by examiner

PLANT FOR MANUFACTURING HALF WARM MIX ASPHALTS

FIELD OF THE INVENTION

The present invention relates to an installation or plant for manufacturing half warm mix asphalts, as well as to a method for operating such an installation or plant.

BACKGROUND OF THE INVENTION

A mix asphalt is generally a combination of asphalt and stone mineral aggregates in exact proportions. The relative proportions of these minerals determine the physical properties of the mix asphalt in question and, possibly, the performance thereof as a finished mix for a determined use.

The mix asphalt must be durable, i.e., it must be resistant to actions such as the detachment of the asphalt film from the aggregate due to the effects of the water, of the abrasion from traffic, etc. Likewise, it must be resistant to traffic stresses through its stability. Furthermore, a mix asphalt must be impermeable so that its components are not under the direct action of atmospheric agents, and at the same time it must be possible to work on it to allow its easy placement and compaction on the ground. Each of these are desirable properties of mix asphalts.

The mentioned mix asphalts can be made in plants by means of suitable equipment for performing this task. According to the properties of these mix asphalts, as well as their layer thicknesses, it is considered that they provide structural capacity to the pavement on which they are arranged.

Thus, roads and pavements are currently made with mix asphalts. The construction, maintenance and use of the mentioned roads and pavements has an enormous impact on the environment. This is why the production and application of reduced-temperature mix asphalts is an enormous progress used today, given that it reduced the mentioned impact to a great extent.

Therefore, the industry has recently focused on reducing the temperatures for the production and application of mix asphalts.

The production and application of mix asphalts under hot conditions typically requires the materials to be heated between 135° C. and 180° C. This temperature is partly dictated by the viscosity of the asphalt binder and is necessary for assuring a homogeneous and complete coating of the aggregates by the asphalt.

Said limitations must be taken into account when considering the possibilities of reducing the temperatures for the production and application of the mentioned mix asphalts together with the need to assure the mechanical properties of the new pavement.

There are several options for achieving the previous objectives by using mix asphalts at significantly reduced temperatures, one of which is to use warm mix asphalts the production and application of which requires the materials to be heated between 60° C. and 100° C., such that a considerable saving in energy is achieved, as well as considerable reduction of emissions to the environment ($CO_2$, $SO_x$, $NO_x$, volatile organic compounds, dust, etc.).

Known plants which currently use semi-hot mix asphalt production processes have drawbacks, such as for example that they are fixed and non-versatile installations, the minimum temperatures obtained being 130° C., such that only asphalt products of a determined type can be obtained with them. Furthermore, these known plants have the drawback of not being capable of reducing this temperature due to process limitations, and reaching the 60-100° C. which are achieved with the plants object of the invention, which entails errors and deficiencies in the operation thereof.

The present invention is aimed at solving the aforementioned drawbacks.

SUMMARY OF THE INVENTION

Thus, the present invention, according to a first aspect, relates to a plant for manufacturing half warm mix asphalts in a controlled manner, such that main advantages of the plant of the invention with respect to known plants are the following:

the plant of the invention is mobile and does not require any civil work for its installation;
the plant of the invention is highly versatile, being able to obtain several different products with it;
the plant of the invention is completely automated, allowing an exact control thereof and of its processes;
the plant of the invention achieved warm asphalts at temperatures less than 100° C. by mixing special emulsions and not bitumens.

The plant for manufacturing half warm mix asphalts according to the invention comprises:

a first mobile platform comprising in turn: at least one hopper for feeding the aggregates of the half warm mix asphalt, an automated bypass feeder for the mentioned at least one hopper, which controls the proportion of exit of material therefrom, two conveyor belts for the exit aggregates of the at least one hopper, a device for positioning said exit material of the previous conveyor belt on a second mobile platform or on the fourth platform directly, without passing the second one and not heating the desired aggregate fraction, and two power units;

a second mobile platform comprising in turn: a shuttle conveyor belt carrying the exit material of the first mobile platform towards the drying drum, and from the latter to a fourth mobile platform, an electric cabinet for control, a drying drum connected to a burner wherein the aggregates are heated and a fume exhaust for the fumes coming from the drying drum and directed towards the third mobile platform;

a third mobile platform comprising in turn: a filter connected to the fume exhaust coming from the second mobile platform, a fume exhaust connected to the previous filter and an electric cabinet wherein this third mobile platform is controlled;

a fourth mobile platform comprising in turn: a lifting belt for transporting the material coming from the exit of the second mobile platform or, in its absence, directly from the first mobile platform, towards a mixer, a compressor for actuating the opening of the mixer, a water tank, at least one cement batcher and at least one filler batcher, a mixer, wherein the previous components are mixed (depending on the desired end product, different products can be mixed, such as: water, cement, filler and emulsion) and a control cabin for controlling this fourth mobile platform;

at least one silo for storing and unloading cement;
at least one silo for storing and unloading filler;
a fuel tank for feeding the drying drum and burner of the second mobile platform;
at least one silo for storing and unloading emulsion material;

at least one mobile belt parallel to the second mobile platform, for heating or not heating the desired exit material of the first mobile platform.

According to a second aspect, the invention relates to a method for operating such a plant, this method comprising the following steps:
a) the aggregates of the mix asphalt are stored in the hoppers of the first mobile platform, with a specific grain size curve;
b) the mentioned aggregates are supplied in a previously determined percentage according to the mix asphalt which is to be achieved, said percentage being controlled by the bypass feeders of the hoppers of the first mobile platform;
c) the bypasses of the feeders of the hoppers control in which of the two exit conveyor belts of the first mobile platform the mentioned aggregates must be supplied, such that the latter subsequently pass either through the second mobile platform or through the parallel mobile belt directly to the fourth mobile platform;
d)
  d.1) the aggregates passing to the second mobile platform are heated in the drying drum thereof, and, in the third mobile platform, the filler thereof is extracted in the filter of said third mobile platform, subsequently passing to the fourth mobile platform of the plant;
  d.2) the aggregates which do not pass to the second mobile platform are directly carried by the parallel mobile belt to the fourth mobile platform of the plant;
e) once in the fourth mobile platform, the aggregates are lifted by the lifting belt of said platform, being carried to the mixer thereof, wherein all the products are mixed in specific proportions, according to the end mix asphalt product which is desired, materials such as water, aggregate, cement, filler and/or emulsion being able to be mixed.

Other features and advantages of the present invention will be inferred from the following detailed description of an illustrative embodiment of its object in relation to the attached figures.

DETAILED DESCRIPTION OF THE INVENTION

Figure 1:
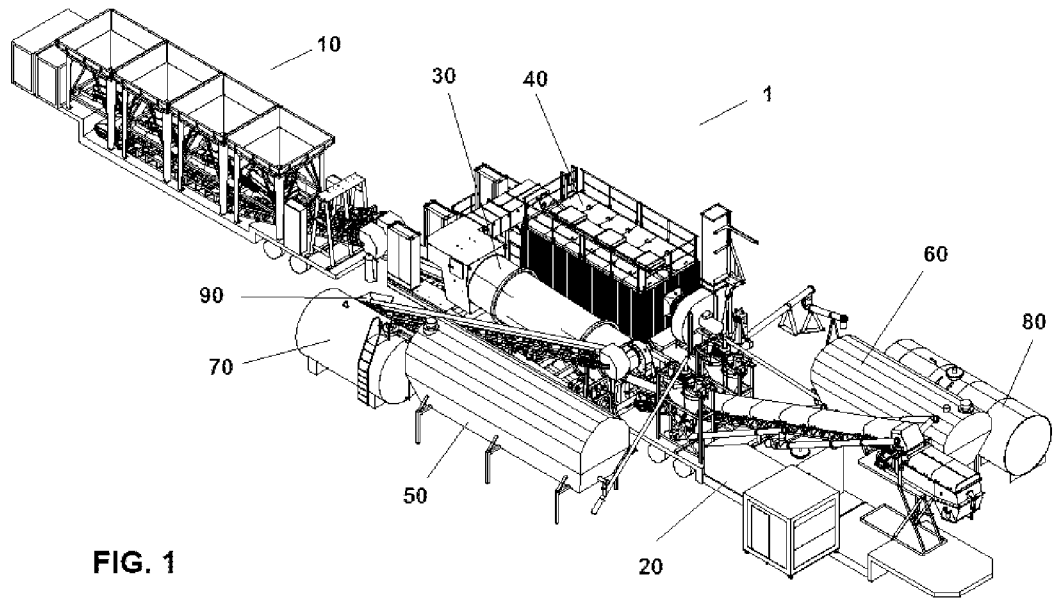
FIG. 1 schematically shows the components and the installation of a plant for manufacturing half warm mix asphalts according to the present invention.
Figure 2:
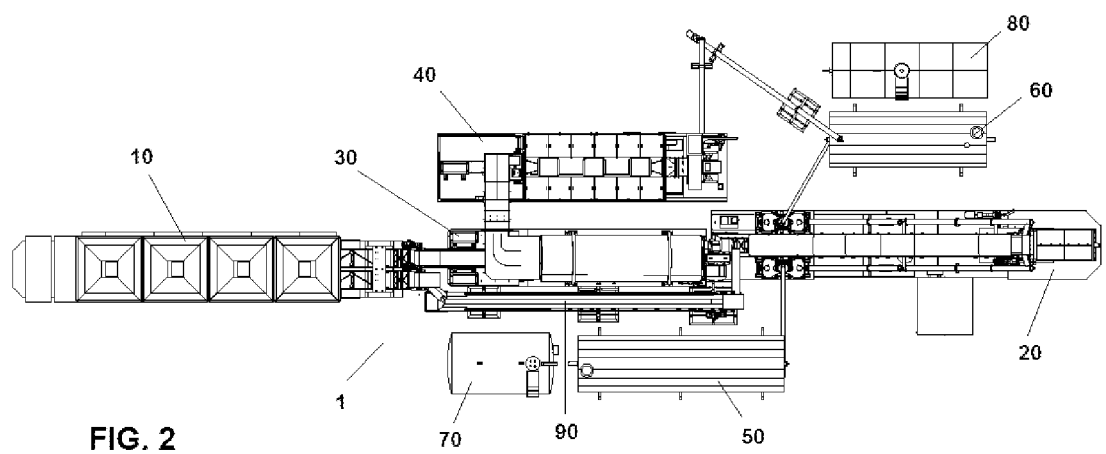
FIG. 2 shows a plan view of a diagram of the components and the installation of a plant for manufacturing half warm mix asphalts according to the present invention.
Figure 3:
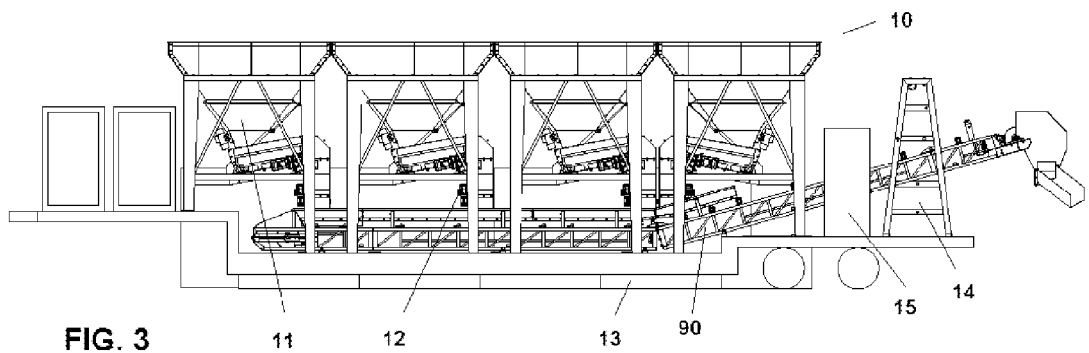
FIG. 3 schematically shows a front view of the first mobile platform of a plant for manufacturing half warm mix asphalts according to the present invention, wherein its components can be observed.
Figure 4:
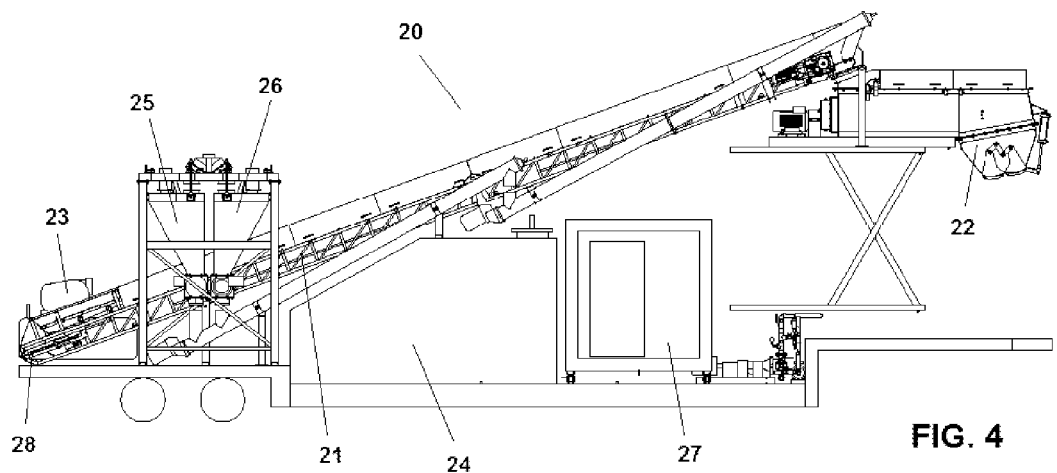
FIG. 4 schematically shows a front view of the fourth mobile platform of a plant for manufacturing half warm mix asphalts according to the present invention, wherein its components can be observed.
Figure 5:
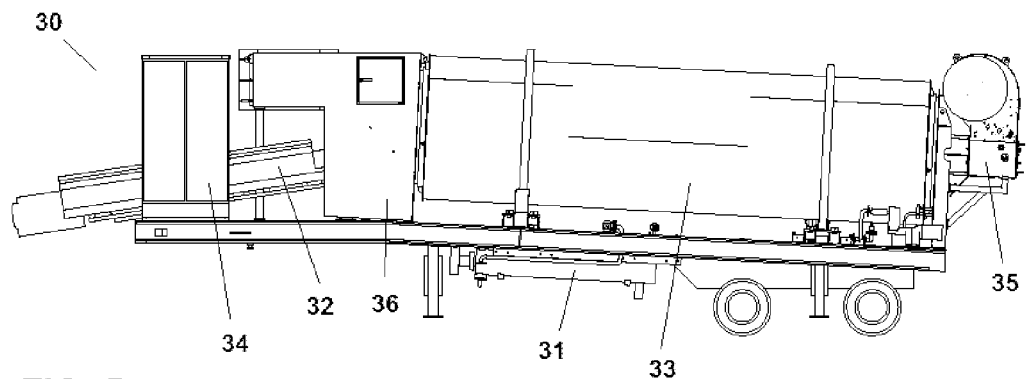
FIG. 5 schematically shows a front view of the second mobile platform of a plant for manufacturing half warm mix asphalts according to the present invention, wherein its components can be observed.
Figure 6:
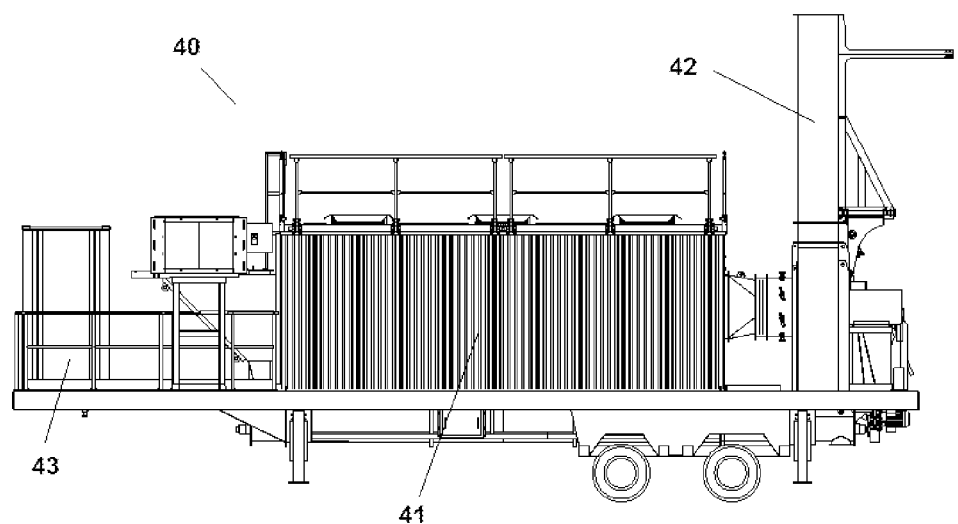
FIG. 6 schematically shows a front view of the third mobile platform of a plant for manufacturing half warm mix asphalts according to the present invention, wherein its components can be observed.

The present invention develops, in a first aspect, a plant 1 for manufacturing half warm mix asphalts in a controlled manner, which comprises:
  a first mobile platform 10 comprising in turn: at least one hopper 11 for feeding the aggregates of the half warm mix asphalt, an automated bypass feeder 12 for the mentioned at least one hopper 11, which controls the proportion of exit of material therefrom, two conveyor belts 13 for the exit aggregates of the at least one hopper 11, a device 14 for positioning said exit material of the previous conveyor belts 13 on a second mobile platform 30, an electric cabinet 15 and two power units;
  a second mobile platform 30 comprising in turn: a temperature exchanger 31 carrying the consumption material of a fuel tank 70 towards a burner 35, a shuttle belt 32 transporting part of the exit material of the first mobile platform 10 towards a drying drum 33, an electric cabinet 34 for control and actuation, a drying drum 33 connected to the burner 35 wherein the flame which will heat the aggregates is made, and a fume exhaust 36 for the fumes coming from the drying drum 33 and directed towards the third mobile platform 40 (see FIG. 6);
  a fourth mobile platform 20 comprising in turn: a lifting belt 21 for transporting the material coming from the exit of the first mobile platform 10 or of the second mobile platform 30, when the material comes directly from the drying drum 33 of the second mobile platform 30, towards a mixer 22, a compressor 23 for actuating the opening of the mouth 28 for the exit of material for the asphalting, a water tank 24, at least one cement batcher 25 and at least one filler batcher 26, a mixer 22, wherein the previous components (emulsion, cement, filler, water and material coming from the first mobile platform 10) are mixed, and a control cabin 27 wherein there are computers controlling the operation of the entire installation (see FIG. 4);
  a third mobile platform 40 comprising in turn: a filter 41 connected to the fume exhaust 36 coming from the second mobile platform 30, a fume exhaust 42 connected to the previous filter 41 and an electric cabinet 43 wherein this third mobile platform 40 is controlled (see FIG. 6);
  at least one silo 50 for storing and unloading cement (see FIG. 7);
  at least one silo 60 for storing and unloading filler (see FIG. 7);
  a fuel tank 70 for feeding the drying drum 33 and burner 35 of the second mobile platform 30;
  at least one silo 80 for storing and unloading emulsion material;
  at least one mobile belt 90 parallel to the second mobile platform 30, for heating or not heating the desired exit material of the first mobile platform 10.

Thus, the plant 1 for manufacturing half warm mix asphalts according to the invention is a completely mobile plant which can be assembled in four mobile platforms 10, 20, 30 and 40. The plant 1 of the invention in turn comprises at least one silo 50 for storing and unloading cement, this silo preferably being horizontally arranged by means of a platform with extendable legs. The silo 60 for storing and unloading filler is also preferably horizontally arranged by means of another platform with legs which are extendable to the floor. The fuel tank 70 of the plant 1 is preferably arranged on a horizontal platform, the tank 80 for storing and unloading emulsion material being located on another platform to the floor. Thus, once assembled, each platform, 10, 20, 30 and 40 of the plant 1 of the invention will occupy a maximum width of 18 meters and will have a maximum height of 4.40 meters.

The versatility of the plant 1 of the invention makes it possible to, with one and the same type of plant 1, obtain different end products, in addition to the half warm mix asphalts or warm agglomerates, such as: soil-cement, gravel-cement, gravel-emulsion, cold agglomerate, concrete, agglomerate recycling or asphalt recycling, etc.

The main benefits derived from the use of half warm mix asphalts can be summarized as the following:
- saving in energy consumption of up to 75%;
- higher eco-efficiency (energy saving with minimum emissions);
- temperature of the aggregate between 70° C. and 100° C. (warm mixes);
- reduction of emissions into the environment ($NO_x$, $SO_x$, $CO_2$);
- reduction of volatile organic carbon compounds (VOCs);
- improvement of the safety and health conditions of the workers, since work is done with low-temperature aggregates and the emissions are reduced;
- minimization of the aging of the binder, since the latter is not at such a high temperature as in hot mix asphalts;
- higher independency of the transport and weather conditions, since a separate transport in four mobile platforms is carried out;
- higher level of recycling (RAP).

Thus, some of the main advantages of the plant 1 of the invention over the known plants are the following:
- the plant of the invention is mobile and does not require any civil work for its installation, its assembly being performed in a day;
- the plant of the invention is highly versatile, being able to obtain several different products with it;
- the plant of the invention is completely automated, allowing an exact control thereof and of its processes: exact controls of aggregates, cement, water, emulsion and filler and exact controls of temperature;
- the plant of the invention allows the mobility of automated equipment, such as conveyor belts 13, shuttle belt 32, lifting belt 21 and control cabin 27;
- the loading of the trucks in the plant 1 of the finished products is performed at zero elevation;
- the plant 1 comprises built-in power units (2 units).

Figure 7:
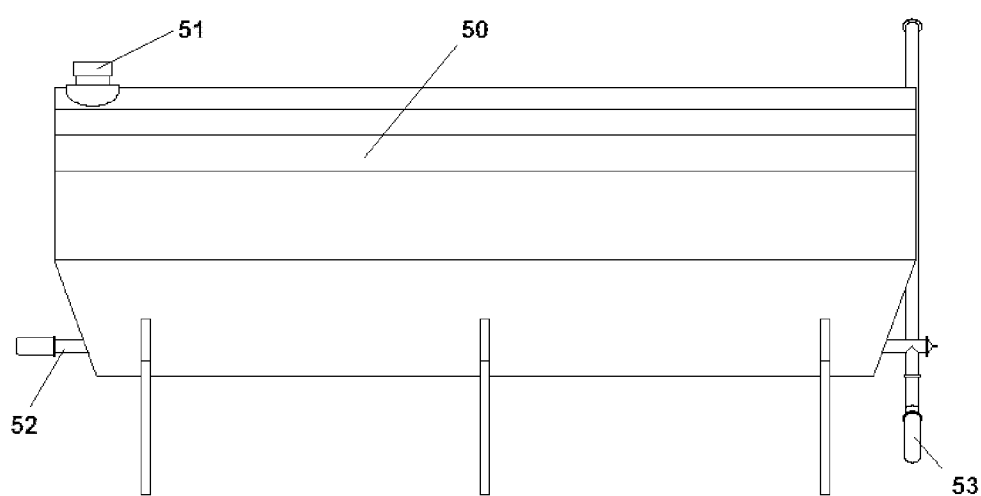
FIG. 7 schematically shows a front view of a silo used in the storage and distribution of cement or filler of a plant for manufacturing half warm mix asphalts according to the present invention.

Any of the silos for cement, 50, or for filler, 60, as shown in FIG. 7 (for the particular case of a cement silo 50) comprises: a filter 51, a loading worm screw 52 and an unloading worm screw 53.

Some of the essential features of the operation and operational capacity of the plant 1 of the invention are detailed below, in Table 1:

TABLE 1

| Efficiency of the installation | |
|---|---|
| Efficiency of the installation: | Efficiency with aggregates with a total of 10% binder and filler |

TABLE 1-continued

| | supplied when adding recovered internal filler |
|---|---|
| Constant efficiency: | Heavy mixing process. |
| Maximum power: | 400 HP |
| Drying/Heating of the aggregate: | Aggregate inlet moisture = 3% |
| Shape of the aggregate: | Cubic, according to the paving construction standard |
| Grain size: | Max. 45 mm |
| Service status: | Continuous regimen, with the same formula with suitable handling and transport |
| Environmental conditions | |
| Temperature: | From +2 to +50° C. |
| Altitude: | <1000 m above sea level |
| Seismic movements: | <0.9 m/s² maximum horizontal acceleration |
| Air load, snow load: | Reference values according to standard DIN 1055, part 1, 3, 4 and 5 |
| Electric installation | |
| Designed for a voltage of: | 400/230 V - 50 Hz |
| External treatment | |
| All the treated parts have: | 1 layer of primer + 1 layer of finish |
| Color of the plant: | according to concept |

The filter 41 of the third mobile platform 40 allows collecting powders in the asphalt industry. This filter 41 allows reducing powders to the lowest possible level according to the current standard. The separation of the powder and of the gas occurs in the bags of the filter 41. The filler accumulates as a coating in the outer surface of the mentioned bags, the washing of which is obtained by means of a rotating mechanism creating a reverse air flow. The washing is done section by section, sending an atmospheric air flow through the bag. The powder which will cover the bags collapses and falls into a collecting hopper, being sent to the plant 1 through a flap valve.

The mixed aggregates, coming from the pre-batchers or hoppers 11 of the first mobile platform 10, are dried in a drying drum 33 of the second mobile platform 30 and heated at the necessary temperature for the following stage. The cylinder of the drying drum 33 works according to the counterflow method, directing the aggregates towards the flame. The drying drum 33 is loaded with a feeding belt or shuttle belt 32, the cylinder of the drying drum 33 being inclined towards the unloading, and being actuated by friction. The vanes in the area in which the flame is located orient the aggregates around the flame but do not interrupt the combustion process.

According to a second aspect, the invention relates to a method for operating a plant 1 as has been defined above, this method comprising the following steps:
a) the aggregates of the mix asphalt are stored in the hoppers 11 of the first mobile platform 10, with a specific grain size curve;
b) the mentioned aggregates are supplied in a previously determined percentage according to the mix asphalt which is to be achieved, said percentage being controlled by the bypass feeders 12 of the hoppers 11 of the first mobile platform 10;
c) the bypasses of the feeders of the hoppers control in which of the two exit conveyor belts of the first mobile platform the mentioned aggregates must be supplied, such that the latter subsequently pass either through the second mobile platform or through the parallel mobile belt directly to the fourth mobile platform;

d)
- d.1) the aggregates passing to the second mobile platform are heated in the drying drum thereof, and, in the third mobile platform, the filler thereof is extracted in the filter of said third mobile platform, subsequently passing to the fourth mobile platform of the plant;
- d.2) the aggregates which do not pass to the second mobile platform are directly carried by the parallel mobile belt to the fourth mobile platform of the plant;

e) once in the fourth mobile platform, the aggregates are lifted by the lifting belt of said platform, being carried to the mixer thereof, wherein all the products are mixed in specific proportions, according to the end mix asphalt product which is desired, materials such as water, aggregate, cement, filler and/or emulsion being able to be mixed.

Those modifications comprised within the scope defined by the following claims can be introduced in the embodiments which have just been described.

What is claimed is:

1. A plant for manufacturing warm mix asphalts without bitumen which comprises:
   I. a first moveable platform for feeding in a controlled manner aggregates to a second moveable platform comprising at least one hopper for feeding the aggregates, an automated bypass feeder for controlling the proportion of aggregate exit, two conveyor belts for conveying the aggregates coming from the hopper, and a device for positioning the aggregate coming from the conveyor belt to a second moveable platform;
   II. a second moveable platform for heating between 70° C. and 100° C. the aggregates coming from the first moveable platform comprising a drying drum;
   III. a third moveable platform for extracting and filtering powder from the aggregates coming from the second moveable platform, for subsequently feeding it to a fourth moveable platform comprising a filter connected to a fume exhaust coming from the second moveable platform, a fume exhaust connected to the filter and an electric cabinet;
   IV. a fourth moveable platform for mixing the aggregates, binder which is an emulsion, filler and with any other materials in order to obtain a warm asphalt mix; comprising a lifting conveyor for conveying the material coming from the second moveable platform, a mixer, a compressor for controlling the opening of the mixer, a water tank and a control cabin for controlling the fourth moveable platform;
      wherein, the plant further comprises a moveable conveyor located parallel to the second moveable platform, for directly conveying aggregates from the first platform to the fourth platform.

2. The plant according to claim 1, wherein the second moveable platform further comprises a temperature exchanger, a shuttle conveyor belt for conveying the exit material from the first moveable platform towards the drying drum, and an electric cabinet for controlling the drying drum connected to a burner wherein the aggregates are heated between 70° C. and 100° C. and a fume exhaust for the fumes coming from the drying drum and directed towards the third moveable platform.

3. The plant according to claim 1, wherein the fourth moveable platform further comprises at least one cement batcher and at least one filler batcher.

4. The plant according to claim 1, wherein the plant further comprises at least one silo for storing and unloading cement.

5. The plant according to claim 1, the plant further comprising at least one silo for storing and unloading filler.

6. The plant according to claim 1, the plant further comprising at least one fuel tank for feeding the drying drum and burner of the second moveable platform.

7. The plant according to claim 1, the plant further comprising at least one silo for storing and unloading emulsion material.

8. The plant according to claim 1, the fourth moveable platform for mixing emulsion selected from soil-cement, gravel-cement, gravel-emulsion, cold agglomerate, concrete, agglomerate recycling or Recycled Asphalt Product (RAP).

9. The plant according to claim 8, wherein the cylinder of the drying drum of the second moveable platform works according to the counterflow method, directing the aggregates towards a flame.

* * * * *